United States Patent [19]

Laing

[11] Patent Number: 4,519,380
[45] Date of Patent: May 28, 1985

[54] INTERMITTENT THROUGH-FLOW COLLECTOR

[76] Inventor: Karsten Laing, Herrenstrasse 57, 7500 Karlsruhe, Fed. Rep. of Germany

[21] Appl. No.: 623,532

[22] Filed: Jun. 21, 1984

Related U.S. Application Data

[60] Division of Ser. No. 469,081, Mar. 1, 1983, abandoned, which is a continuation of Ser. No. 123,408, Feb. 20, 1980, abandoned.

[30] Foreign Application Priority Data

Feb. 27, 1979 [AT] Austria ................................ 1498/79

[51] Int. Cl.³ ............................................... F24J 3/02
[52] U.S. Cl. .................................... 126/422; 126/437
[58] Field of Search ............... 126/419, 420, 422, 437, 126/418; 137/59, 60, 61; 138/32; 237/80

[56] References Cited

U.S. PATENT DOCUMENTS

| | | | |
|---|---|---|---|
| 1,853,480 | 4/1932 | Wheeler et al. ..................... | 126/422 |
| 4,119,087 | 10/1978 | Cook .................................... | 126/422 |
| 4,153,840 | 5/1979 | Harrison .............................. | 126/420 |
| 4,378,784 | 4/1983 | Frank .................................. | 126/418 |

FOREIGN PATENT DOCUMENTS

| | | | |
|---|---|---|---|
| 372965 | 1/1927 | Fed. Rep. of Germany ........ | 137/32 |
| 325928 | 3/1970 | United Kingdom ................ | 126/437 |
| 1500613 | 2/1978 | United Kingdom ................ | 126/422 |

*Primary Examiner*—Samuel Scott
*Assistant Examiner*—G. Anderson
*Attorney, Agent, or Firm*—Pennie & Edmonds

[57] ABSTRACT

A solar collector system having an absorber element including fluid flow channels therein and a cold water inlet and hot water outlet. A temperature sensor is included in the hot water outlet and operates a valve in the cold water inlet to open the valve when the temperature reaches a predetermined value and to close the valve when the temperature drops below the predetermined value whereby the valve operates cyclically to intermittently fill the absorber channels with cold water and to displace hot water therefrom.

3 Claims, 7 Drawing Figures

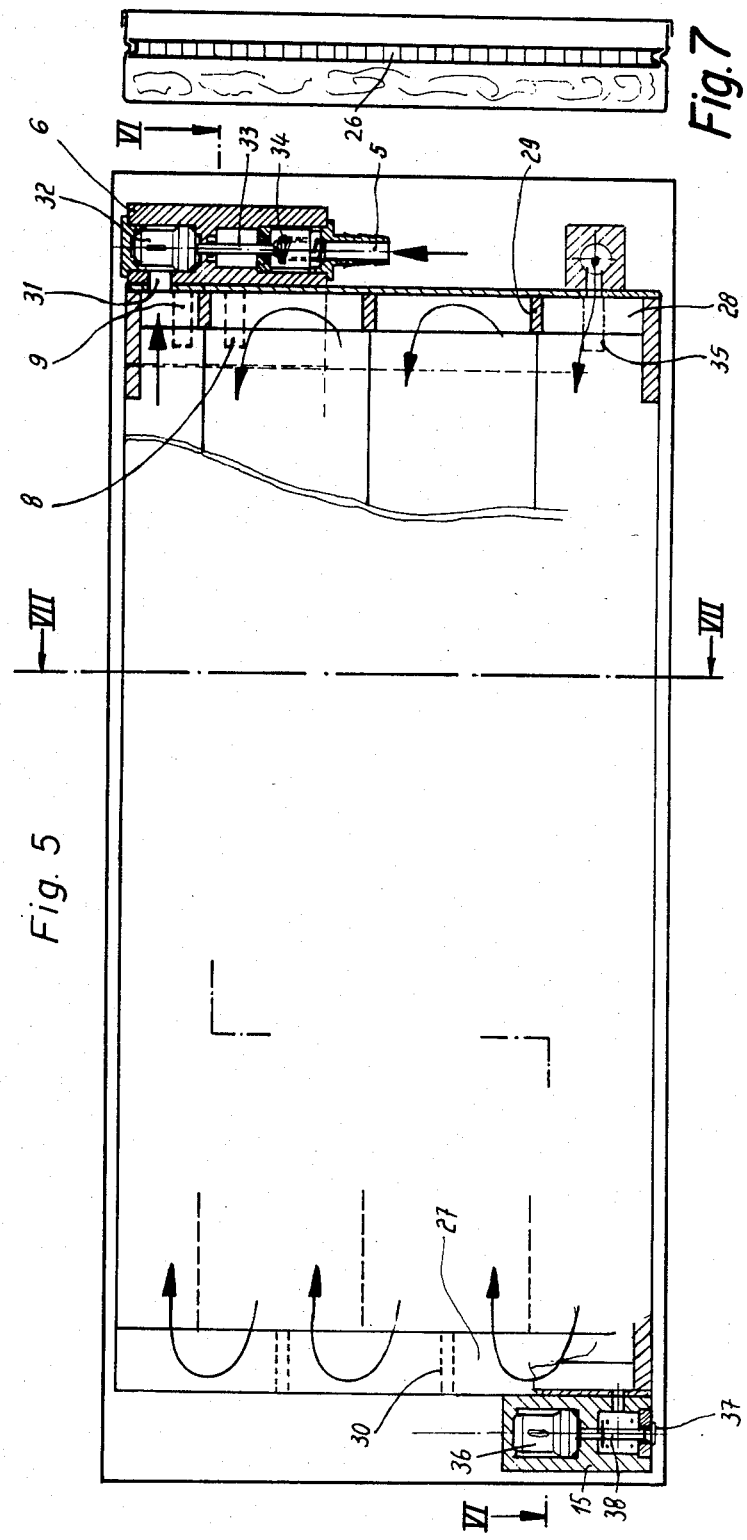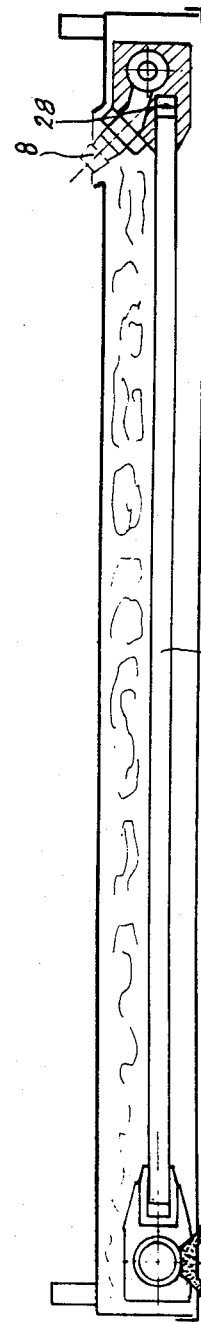

4,519,380

INTERMITTENT THROUGH-FLOW COLLECTOR

This application is a division of my copending application Ser. No. 469,081, filed Mar. 1, 1983 which in turn is a continuation of my application Ser. No. 123,408, filed Feb. 20, 1980, both now abandoned.

FIELD OF THE INVENTION

This invention relates to an intermittent through-flow collector and more particularly to a solar collector having an absorber element through which a heat carrier fluid intermittently flows.

BACKGROUND ART

Solar collector systems for heating water have been utilized when the system includes a heat absorbing element in thermal contact with a heat carrier fluid which has a freezing point below that to which the collector may be subjected during winter time. The heat carrier fluid in such systems is pumped by a pump through a heat exchanger where the heat in the carrier fluid is transferred to water in turn circulated in a utility water circuit. Such systems are expensive to construct and operate, and their efficiency drops on increasing temperatures in comparison with those systems that circulate water directly in the absorber element and which do not use any separate heat exchanger. This is due in part to loss of heat in the heat exchanger unit itself.

Further conventional solar collectors having conventional metal absorber elements where water is circulated through the absorber element are subjected to deposits building up in the absorber element resulting from calcification of calcium containing water. Plastic absorber elements have been proposed to overcome the calcification problem but these have not been entirely satisfactory in that the plastic material loses its strength, particularly where parts are glued or welded together, due to high water temperatures. Further, such collectors in which water flows directly from the heat absorber element to the utility water circuit are subject to damage when the outside temperature drops below freezing due to water expanding on freezing.

It is therefore an object of my invention to provide for a solar collector in which water is heated by thermal contact with the absorber element of the collector and transferred directly to the utility water circuit without the intermediary of a separate heat exchanger, where the absorber element will not be subjected to unduly high temperatures, and which at the same time includes provision for preventing damage when the outside ambient temperature drops below the freezing point of water.

GENERAL DESCRIPTION OF THE INVENTION

Broadly a solar collector according to the invention has an absorber element preferably made of a thermoplastic synthetic material having water channels therein which are connected at one end to a cold water inlet pipe and at another end to a hot water outlet pipe. A temperature sensor device is included in the hot water outlet pipe and controls an inlet valve in the cold water inlet pipe such that when the temperature in the sensor reaches a predetermined value, it will open the inlet valve to allow cold water to enter the water channels in the absorber and force the hot water out of the element into the utility water circuit. When the temperature in the sensor drops to a predetermined value, the inlet valve will close. The opening and closing of the inlet valve sets up an intermittent or cyclic flow of water through the absorber element preventing any large build up of heat in the element which could result in damage as sometimes occurs with conventional solar collectors.

In order to prevent damage to the absorber element when outside temperatures drop below the freezing point of water, a temperature controlled discharge valve is located at the bottom of the absorber element which opens when outside temperature drops near to the freezing point of water to allow water to drain from the element before it may freeze. Preferably the sensor for the discharge valve is located exteriorly of the element in the ambient air surrounding the solar collector which assures that it approaches the freezing point temperature sooner than the water in the absorber element.

BRIEF DESCRIPTION OF THE DRAWINGS

FIG. 5 is a partial sectional plan view of an absorber element for use in the system of FIG. 1;

FIG. 6 is a sectional view of the absorber element of FIG. 5 taken along lines VI—VI; and, FIG. 7 is a sectional view of the absorber element of FIG. 5 taken along lines VII—VII.

DETAILED DESCRIPTION OF THE PREFERRED EMBODIMENT

Figure 1:
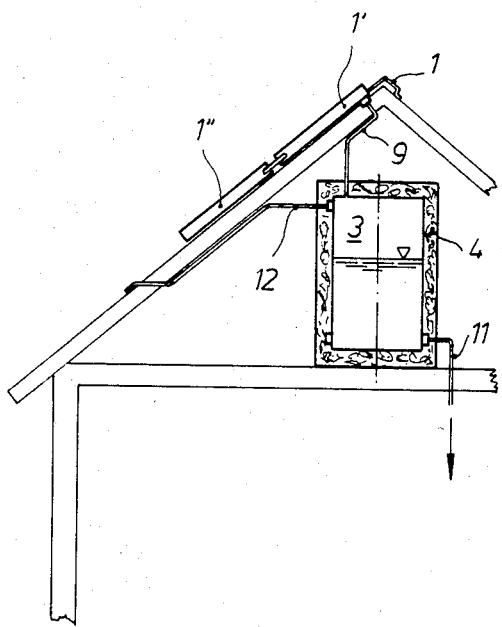
FIG. 1 is a partial end sectional view of a solar collector system constructed according to the invention installed in a house.
Figure 2:
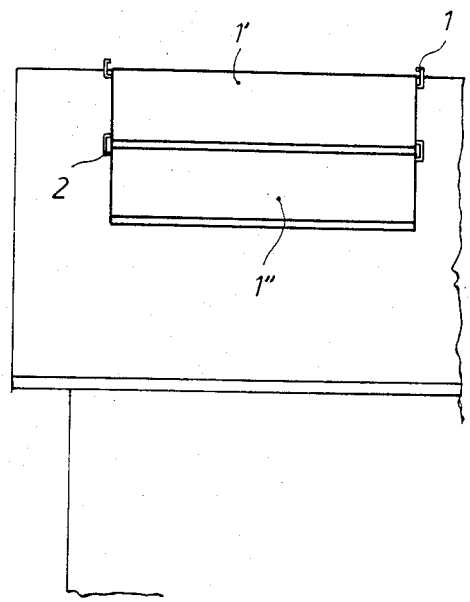
FIG. 2 is a side view of the house of FIG. 1.

Referring to FIGS. 1 and 2, there is illustrated solar collectors 1' and 1" which are fixed to the ridge area of a rooftruss by means of hooks 1. Hooks 2 join the collectors 1' and 1", and while only two collectors are shown, it is to be understood that any number of collectors could be connected together by hooks 2 as shown in FIG. 2.

The loft area of the house shown in FIG. 1 has a hot water holding tank 3 which is connected by means of a hot water outlet pipe 9 to the highest point of the highest collector 1' of the group of collectors. The holding tank 3 has an outlet pipe 11 connected to the hot water utility circuit of the house and an overflow pipe 12 which leads outside the house and through which excess hot water may escape.

Figure 3:
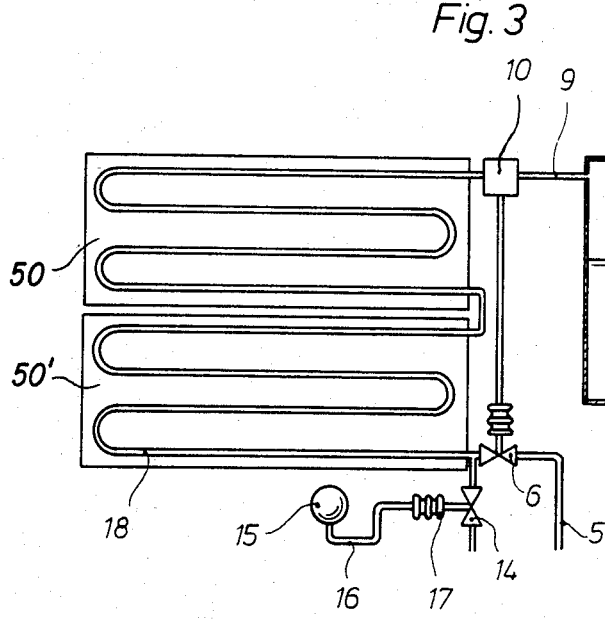
FIG. 3 is a diagrammatic view of the solar collector system of FIG. 1 utilizing a non-pressurized holding tank.

Referring to FIG. 3 which illustrates the principles of operation of the system, there is shown absorber elements 50 and 50' having channels 18 therein through which water may flow. As shown, the lowermost end of the lowest element 50' is connected to a cold water inlet pipe 5 by way of a temperature responsive valve 6 controlled by a temperature sensor 10 such that when sensor 10 reaches a predetermined valve, it will open valve 6 allowing cold water to enter channels 18 and to force hot water therefrom into the holding tank 3. When cold water reaches the sensor 10, it will cause the valve 6 to close after which the water in the channels will be heated to again repeat the cycle of emptying hot water from the absorber element. Thus it is seen that the filling of the absorber elements will be intermittent and cyclic in operation leading to cyclic filling of the holding tank 3. This cyclic operation will prevent any excessive build up of heat in the absorber element allowing it to be made of plastic without fear of the joints of the plastic being damaged or weakened due to excessive or prolonged exposure to high temperatures.

Sensor 10 is preferably exposed to sunlight so that heating by the sun will raise it to the predetermined temperature to open the valve 6 and begin filling of the channels 18. The water in the channels 18 will be heated to a somewhat higher temperature which when it flows through the sensor 10 will keep the valve 6 open until cold water reaches the sensor causing the valve 6 to then close.

The hot water flows through the pipe 9 into the insulated holding tank 3 which is connected to the hot water utility circuit by perforated tube 7. The tank has an overflow pipe 12 through which hot water may flow to allow continued cyclic operation of valve 6 in the event no hot water is used in the utility circuit.

A discharge valve 14 is positioned at the lowestmost point of the bottom absorber element 50' and is controlled by sensor 15. Sensor 15 comprises a hollow vessel filled with water and is connected to valve 14 by an expansion element. The sensor 15 is exposed to ambient air such that when water in the sensor freezes, it will cause expansion element 17 to move to open valve 14. Water in channels 18 of the absorber elements will then drain out of the elements while air will flow from the tank 3 through the sensor 10 into the channels. Thus it is seen that provision is included in the system to automatically drain the absorber elements of the system upon a drop in ambient temperature to the freezing point of water.

Figure 4:
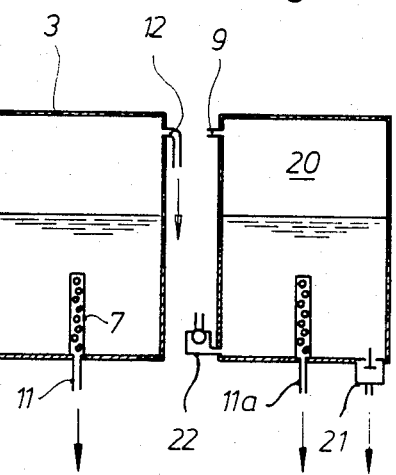
FIG. 4 is a view of a pressurized holding tank that may be used in the system of FIG. 3 instead of a non-pressurized holding tank.

Referring to FIG. 4, a pressurized holding tank or storage vessel is shown which may be used in the system instead of the non-pressurized tank of FIG. 3. As shown, hot water driven from the absorber elements by the pressure of the entering cold water flows through the pipe 9 into the tank to form an air cushion 20 of compressed air. This cushion forces the hot water to flow through the pipe 11a under pressure into the hot water utility circuit.

If the pressurized tank is emptied, float valve 22 opens allowing air from outside the tank to flow into the tank whereby any air of the air cushion 20 that may be dissolved in water may be replaced. A pressure relief valve 21 is included at the bottom of the tank to prevent excessive pressure build-up and at the same time to allow the absorber to continually be subjected to cyclic filling of cold water to prevent its overheating during those periods when no hot water is being drawn off by the hotwater utility circuit.

Referring to FIGS. 5, 6 and 7, there is shown an absorber element 25 made of an extrudable thermoplastic material and containing a plurality of parallel channels 26 which communicate with each other at their ends 27 and 28. Webs 29 and 30 contained in the absorber element direct the flow of water as shown by the arrows.

A valve body 6' is arranged at the highest point of the highest absorber element and has an inlet socket 5' for cold water and an outlet socket 9' for warm water. A thermal expansion element 32 is positioned in an outlet region 31 of the valve body such that heated water will flow around the expansion element before the water reaches the outlet socket. When the temperature of the water reaches a predetermined value, the expansion element moves the valve stem 33 and the valve plate 34 to open the connection between the cold water inlet socket 5' and a cold water outlet socket 8. Socket 8 is connected by a hose with an inlet socket 35 at the bottom of the absorber element such that the flow of water in the absorber element is the same as that shown diagrammatically in FIG. 3. Further, the absorber element 25 may be connected to similar elements in the manner shown in FIG. 3 such that the socket 9' of a lower absorber element is connected to the socket 5' of an adjacent higher absorber element.

The absorber element 25 has a temperature responsive discharge valve 37 which is activated by a thermal actuator 36 to move the valve stem 38 and associated valve 37 all contained within a hollow body 15'. Water is contained within the hollow body 15', and when the water freezes and expands, it moves the thermal actuator 36.

The hollow body 15' is black on its upper surface and reflective on all other surfaces. This surface construction allows the water in the hollow body to freeze when the ambient temperature drops below 0° C. before the water in the channels of the absorber element can freeze. Opening of the valve 37 which is situated in the lowest point of each absorber element allows all of the water to drain from the element.

Water collector systems according to the invention and particularly the absorbing element may be exposed directly to ambient air so that infrared dissipation of the element is not reduced or hindered by any transparent cover.

I claim:

1. A solar collector system having an absorber element including fluid flow channels therein, a cold water inlet positioned at the vertically lowest point in the absorber and adapted to be connected to a pressurized source of cold water through a cold water inlet valve, and a hot water outlet positioned at the vertically highest point in the absorber and connected with a hot water holding tank leading to a hot water utility circuit positioned vertically lower than said tank whereby said tank maintains operating pressure in said circuit; characterized in that said hot water outlet is in unrestricted communication with said hot water holding tank, in having a temperature sensor in the hot water outlet which opens said inlet valve upon the water temperature in the hot water outlet reaching a predetermined value and which closes said inlet valve when said temperature is below said predetermined value whereby hot water in said channels is intermittently displaced by cold water from said cold water inlet and whereby water pressure within the fluid flow channels of the absorber is independent of the pressure of the cold water of the cold water inlet, and in that said cold water inlet valve includes a valve body positioned at the top of the absorber having a cold water inlet socket connected to said pressurized source, a cold water outlet socket, a movable valve plate separating the cold water outlet socket and the cold water inlet socket, a hot water outlet region connected to the absorber, a hot water outlet socket connecting said outlet region with said holding tank, a thermal expansion element in said outlet region operatively connected to said valve plate and a hose connecting said cold water outlet socket with said lowest point of the absorber element.

2. A solar collector system according to claim 1 further characterized in that said absorber element comprises a double-paned extruded plate of a thermoplastic material including parallel extruded webs extending between the panes to form said fluid flow channels.

3. A solar collector system having at least one absorber element including flow channels therein, a cold water inlet adapted to be connected to a pressurized source of cold water through a temperature response cold water inlet valve and a hot water outlet positioned at the vertically highest point in the absorber connected directly with a hot water holding tank in turn connected to a hot water utility circuit, characterized in that the absorber element comprises two thermoplastic panes spaced from each other and joined by a plurality of webs to form a plurality of juxtaposed channels, in having interconnecting channels on the ends of said juxtaposed channels connecting said juxtaposed channels, in having guide means in said interconnecting channels separating the juxtaposed channels into groups which are connected in series, in that said cold water inlet valve includes a valve body positioned at the highest point of a highest absorber, in that said thermally response cold water inlet valve includes a sensor thermally response to the temperature of water in said hot water outlet to cause said valve to open at a predetermined temperature, and in that said valve body encloses said sensor with said body being adapted to be exposed to the sun with the body having a cold water inlet socket and a cold water outlet socket connected to the lowest point of a lowermost interconnecting channel whereby the sensor will cause said cold water inlet valve to open when the sensor is heated to said predetermined temperature by the sun until warm water in the absorber element is expelled and the temperature of the hot water outlet drops below said predetermined temperature to cause said sensor to close said cold water inlet valve whereby an intermittent flow of water occurs through absorber element.

* * * * *